(12) United States Patent
Chen

(10) Patent No.: US 11,070,356 B2
(45) Date of Patent: Jul. 20, 2021

(54) TEXT ENCRYPTION

(71) Applicant: HEWLETT PACKARD ENTERPRISE DEVELOPMENT LP, Houston, TX (US)

(72) Inventor: Liqun Chen, Bristol (GB)

(73) Assignee: Hewlett Packard Enterprise Development LP, Houston, TX (US)

( * ) Notice: Subject to any disclaimer, the term of this patent is extended or adjusted under 35 U.S.C. 154(b) by 225 days.

(21) Appl. No.: 15/754,017

(22) PCT Filed: Mar. 24, 2016

(86) PCT No.: PCT/US2016/024052
§ 371 (c)(1),
(2) Date: Feb. 21, 2018

(87) PCT Pub. No.: WO2017/164882
PCT Pub. Date: Sep. 28, 2017

(65) Prior Publication Data
US 2018/0241543 A1 Aug. 23, 2018

(51) Int. Cl.
*H04L 9/00* (2006.01)
*H04L 9/28* (2006.01)
(Continued)

(52) U.S. Cl.
CPC .......... *H04L 9/008* (2013.01); *G06F 9/30029* (2013.01); *H04L 9/0618* (2013.01);
(Continued)

(58) Field of Classification Search
USPC .......................................................... 380/28
See application file for complete search history.

(56) References Cited

U.S. PATENT DOCUMENTS 5,673,319 A 9/1997 Bellare et al.
6,128,737 A 10/2000 Jakubowski et al.
(Continued)

FOREIGN PATENT DOCUMENTS

CN 1527531 A 9/2004
CN 101061661 A 10/2007
(Continued)

OTHER PUBLICATIONS

European Search Report and Search Opinion Received for EP Application No. 16895686.0, dated Apr. 25, 2018, 11 pages.
(Continued)

*Primary Examiner* — Jeffrey C Pwu
*Assistant Examiner* — Samuel Ambaye
(74) *Attorney, Agent, or Firm* — Hewlett Packard Enterprise Patent Department

(57) ABSTRACT

In one example in accordance with the present disclosure, a method may receiving a plaintext to be encrypted. The plaintext may include a first block, a second block and a third block. The method may include generating a preliminary ciphertext based on the first block and the second block and generating, using an encryption key, a first ciphertext using an encryption operation receiving the third block and the preliminary ciphertext as inputs. The method may also include generating, using the encryption key, a first finalized ciphertext using the encryption operation receiving the first block and the first ciphertext as inputs and generating, using the encryption key, a second finalized ciphertext using the encryption operation receiving the second block and the first finalized ciphertext as inputs.

15 Claims, 5 Drawing Sheets

(51) Int. Cl.
*H04L 9/06* (2006.01)
*H04L 9/08* (2006.01)
*H04L 9/12* (2006.01)
*G06F 9/30* (2018.01)

(52) U.S. Cl.
CPC .......... *H04L 9/0637* (2013.01); *H04L 9/0643* (2013.01); *H04L 9/08* (2013.01); *H04L 9/0861* (2013.01); *H04L 9/12* (2013.01)

(56) References Cited

U.S. PATENT DOCUMENTS

| | | | |
|---|---|---|---|
| 2011/0211691 A1* | 9/2011 | Minematsu | H04L 9/0618 380/46 |
| 2012/0087490 A1 | 4/2012 | Ollikainen et al. | |
| 2012/0207301 A1 | 8/2012 | Ramasamy et al. | |
| 2012/0269340 A1* | 10/2012 | Stu | H04L 9/0822 380/28 |
| 2012/0269348 A1 | 10/2012 | Rong et al. | |
| 2013/0136256 A1 | 5/2013 | Relyea et al. | |
| 2015/0333907 A1 | 11/2015 | Willoughby | |

FOREIGN PATENT DOCUMENTS

| | | |
|---|---|---|
| CN | 102064936 A | 5/2011 |
| CN | 105162590 A | 12/2015 |
| KR | 1020110042419 A | 4/2011 |
| WO | 2009/020060 A1 | 2/2009 |
| WO | WO-2013005929 A2 | 1/2013 |
| WO | 2014/174044 A1 | 10/2014 |

OTHER PUBLICATIONS

European Search Report and Search Opinion Received for EP Application No. 16895686.0, dated Jul. 27, 2018, 10 pages.

International Search Report and Written Opinion, International Application No. PCT/US2016/024052, dated Dec. 5, 2016, pp. 1-8, KIPO.

Virgil D. Gligor and Pompiliu Donescu, "Fast Encryption and Authentication: XCBC Encryption and XECB Authentication Modes," Oct. 27, 2000, pp. 1-49, VDG Inc.

* cited by examiner

TEXT ENCRYPTION

BACKGROUND

Cryptographic encryption can refer generally to techniques to encode plaintext messages or information into ciphertext such that the content of the plaintext is unreadable or otherwise incoherent to unauthorized entities. Such encryption can, for example, be performed using a public or secret encryption algorithm as well as a secret encryption key to encode and decode the ciphertext. In addition, in some encryption schemes, a random or pseudorandom initial value can also be used in order to produce different ciphertexts for identical plaintexts.

BRIEF DESCRIPTION OF THE DRAWINGS

The following detailed description references the drawings, wherein.

DETAILED DESCRIPTION

Traditional block cipher algorithms meeting security conditions may use an initial value. An initial value is a random, pseudorandom or a predictable but unique fixed-size input to a cryptographic primitive. However, there may be reasons why an initial value is undesirable in an implementation of a block cipher chain. For example, using an initial value may incur a communicational cost and/or a storage cost. Using an initial value may also cause security concerns. For example, some modes use a unique, random and/or secret initial value. If the initial value is not unique, random or secret, the security of the scheme can be compromised.

Moreover, using an initial value may cause the block cipher chain to not be deterministic. This means that given a plaintext and a key, two distinct initial values can result in two different ciphertexts. However, in many applications, determination is a desirable property. Two examples of these applications are deduplication and searchable encryption.

Systems and methods for encrypting plaintext discussed herein may perform encryption in an efficient manner without using an initial value. For example, encryption without the initial value may use less than 2 times of the original block cipher computation with an initial value. In aspects making use of a hash function, the number of block cipher computation may be the same as the original block cipher and the only extra cost is a hash function, which is usually less computational costly than a block cipher.

An example method may include receiving a plaintext to be encrypted, wherein the plaintext includes a first block, a second block and a third block and generating a preliminary ciphertext based on the first block and the second block. The method may also include generating, using an encryption key, a first ciphertext using an encryption operation receiving the third block and the preliminary ciphertext as inputs. The method may also include generating, using the encryption key, a first finalized ciphertext using the encryption operation receiving the first block and the first ciphertext as inputs. The method may also include generating, using the encryption key, a second finalized ciphertext using the encryption operation receiving the second block and the first finalized ciphertext as inputs.

Figure 1:
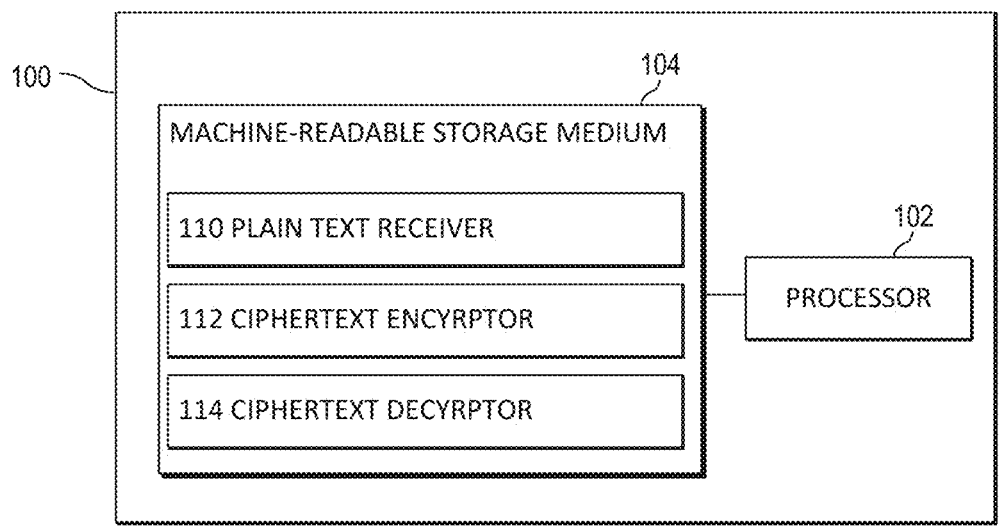
FIG. 1 is a block diagram of an example system for text encryption and text decryption.

FIG. 1 is a block diagram of an example system 100 for text encryption. System 100 may include a processor 102 and a memory 104 that may be coupled to each other through a communication link (e.g., a bus). Processor 102 may include a Central Processing Unit (CPU) or another suitable hardware processor. In some examples, memory 104 stores machine readable instructions executed by processor 102 for system 100. Memory 104 may include any suitable combination of volatile and/or non-volatile memory, such as combinations of Random Access Memory (RAM), Read-Only Memory (ROM), flash memory, and/or other suitable memory. Memory 104 may also include a random access non-volatile memory that can retain content when the power is off.

Memory 104 stores instructions to be executed by processor 102 including instructions for plaintext receiver 110, ciphertext encryptor 112, ciphertext decryptor 114 and/or other components. According to various implementations, system 100 may be implemented in hardware and/or a combination of hardware and programming that configures hardware. Furthermore, in FIG. 1 and other Figures described herein, different numbers of components or entities than depicted may be used.

Processor 102 may execute instructions of plaintext receiver 110 to receive a plaintext to be encrypted. The plaintext may include n blocks including a first block (P1), a second block (P2), a third block (P3) and so on. As used herein, the term "n" denotes an integer value greater than 1.

Processor 102 may execute instructions of ciphertext encryptor 112 to encrypt at least one block of the received plaintext. Ciphertext encryptor 112 may encrypt the blocks of the plaintext by generating a preliminary ciphertext based on the first block and the second block. In an aspect, generating the preliminary ciphertext may comprise generating a first preliminary ciphertext corresponding to the first block, using the first block and the encryption key. Generating the preliminary ciphertext may also comprise generating, using the encryption key, a second preliminary ciphertext corresponding to the second block using the encryption operation receiving the second block and the first preliminary ciphertext as inputs. In some aspects, the first preliminary ciphertext may correspond to a second block and may be generated using the second block and the encryption key. Likewise, the second preliminary ciphertext may correspond to the first block and may be generated using the first block and the encryption key. Moreover, the technique may be used with more than two blocks and the two block implementation is described for the sake of simplicity.

In another aspect, generating the preliminary ciphertext may comprise generating a hash value of the first block and the second block and using the hash value as the preliminary ciphertext.

Ciphertext encryptor 112 may generate, using an encryption key, a first ciphertext using an encryption operation receiving the third block and the preliminary ciphertext as inputs. The encryption operation may comprise, for example, an "exclusive or" (xor) operation. An xor operation is a logical operation that outputs true when inputs differ (i.e. one input is true and the other input is false). Of course, this is an example encryption operation and other encryption operations can be used by ciphertext encryptor 112.

Ciphertext encryptor 112 may generate, using the encryption key, a first finalized ciphertext using the encryption operation receiving the first block and the first ciphertext as inputs. In other words, the first finalized ciphertext may be an encryption of the first block and may replace the preliminary value and/or first preliminary ciphertext. Ciphertext encryptor 112 may generate, using the encryption key, a second finalized ciphertext using the encryption operation receiving the second block and the first finalized ciphertext as inputs. In other words, the second finalized ciphertext may be an encryption of the second block and may replace the preliminary value and/or second preliminary ciphertext. Moreover, the technique may be used with more than three blocks and the three block implementation is described for the sake of simplicity.

Ciphertext encryptor 112 may perform encryption of the plaintext using at least one encryption technique. One example technique is cipher block chaining (CBC). CBC is a mode of operation for a block cipher. A block cipher is a mode of operation where a sequence of bits are encrypted as a single unit or block with a cipher key applied to the entire block.

An example CBC operation utilizing the techniques discussed herein may look something like what is shown in Table 1 below. Of course, this is only an example and ciphertext encryptor 112 may use other modes of operation, such as Cipher Feedback (CFB), Output Feedback (OFB), Counter (CTR) and XFS.

TABLE 1

C1* = E(K, P1),
C2* = E(K, P2 xor C1*)
C3 = E(K, P3 xor C2*)

In the example CBC operation depicted in Table 1, E represents an encryption operation of a block cipher algorithm and K represents an encryption key for the algorithm. An example block cipher algorithm that may be used is Advanced Encryption Standard (AES) although other encryption algorithms may be used. P1 represents a first block of a plaintext, P2 represents a second block of a plaintext and P3 represents a third block of a plaintext. C1* is a first preliminary ciphertext corresponding to the first block, C2* is a second preliminary ciphertext corresponding to the second block and C3 is a first ciphertext corresponding to the third block. In other words, CBC mode may be performed a first time to obtain the first preliminary ciphertext (C1*), the second preliminary ciphertext (C2*) and the first ciphertext (C3). The first preliminary ciphertext (C1*) is generated by performing encryption on the first block using the encryption key. Importantly, the first preliminary ciphertext may be generated without using an initial value. In order to make a CBC based block cipher chain without using an initial value (IV), the IV may be setup as, for example, an empty string or a binary string with a value of zero and/or any other fixed value. In this manner, the IV may not need to be stored and/or transmitted during encryption and decryption of the plaintext. Not having to store or transmit an IV may reduce the storage costs of performing encryption and decryption on the plaintext.

Ciphertext encryptor 112 may generate a second preliminary ciphertext (C2*) by encrypting the second block (P2) of the plaintext. Specifically, ciphertext encryptor 112 may perform encryption of the second block (P2) using the encryption key (K) and performing an encryption operation (for example, an xor operation) using the second block (P2) and the first preliminary ciphertext (C1*) as inputs. Ciphertext encryptor 112 may generate a first ciphertext (C3) by encrypting the third block (P3) of the plaintext. Specifically, ciphertext encryptor 112 may perform encryption of the third block (P3) using the encryption key (K) and performing an encryption operation (for example, an xor operation) using the third block (P3) and the second preliminary ciphertext (C2*) as inputs. At this point, the total ciphertext may be (C1*, C2*, C3). However, without using any IV or using the same IV for each encryption operation, the total ciphertext as this stage may not be suitably encrypted because for two distinct plaintexts which have the same P1 and P2 but different P3, at least two of the encrypted blocks will be the same and may reveal information about the similarity of these two plaintexts. On the other hand, if a unique IV is used for each encryption operation, encrypting a plaintext twice will result in two different ciphertexts. However, in many applications, such as deduplication and searchable encryption, the indistinguishability may not be a desired property. Accordingly, ciphertext encryptor 112 may perform a second CBC mode to re-encrypt the first block (P1) and the second block (P2).

An example second CBC operation may look something like what is shown in Table 2 below.

TABLE 2

C1 = E(K, P1 xor C3)
C2 = E(K, P2 xor C1)

In the example CBC operation depicted in Table 2, E represents an encryption operation of a block cipher algorithm and K represents an encryption key for the algorithm. An example block cipher algorithm that may be used is Advanced Encryption Standard (AES) although other encryption algorithms may be used. P1 represents a first block of a plaintext, P2 represents a second block of a plaintext and C3 represents a first ciphertext corresponding to a third block of a plaintext. 01 is a ciphertext corresponding to the first block and C2 is a ciphertext corresponding to the third block. In other words, CBC mode may be performed a first time, as depicted in Table 1, and then a second time (as depicted in Table 2) to obtain a first finalized ciphertext corresponding to the first block (01) and a second finalized ciphertext corresponding to the second block (C2).

Ciphertext encryptor 112 may generate the first finalized ciphertext (01) by encrypting the first block (P1) of the plaintext. Specifically, ciphertext encryptor 112 may perform encryption of the first block (P1) using the encryption key (K) and performing an encryption operation (for example, an xor operation) using the first block (P1) and the first ciphertext (C3) as inputs. Similarly, ciphertext encryptor 112 may generate the second finalized ciphertext (C2) by encrypting the second block (P2) of the plaintext. Specifically, ciphertext encryptor 112 may perform encryption (E) of the second block (P2) using the encryption key (K) and performing an encryption operation (for example, an xor operation) using the second block (P2) and the first finalized ciphertext (01) as inputs. The total ciphertext is (01, C2, C3). Although the example depicted in Tables 1-2 describes using three blocks, the three block implementation is described for the sake of simplicity and the techniques discussed herein may be used with more than three blocks.

Processor 102 may execute instructions of ciphertext decryptor 114 to decrypt the ciphertext (01, C2, C3). Ciphertext decryptor 114 may decrypt a first block (i.e. P1) of a plaintext (i.e. as discussed above in reference to ciphertext encryptor 112) by performing, using an encryption key, an encryption operation receiving the first finalized ciphertext and the first ciphertext as inputs. The encryption operation may comprise, for example, an exclusive or (xor) operation. Ciphertext decryptor 114 may decrypt a second block of the plaintext by performing, using the encryption key, the encryption operation receiving the second finalized ciphertext and the first finalized ciphertext as inputs. Ciphertext decryptor 114 may re-compute the first preliminary ciphertext by generating a first decrypt ciphertext using the encryption key and the first block. The first decrypt ciphertext may be the same as the first preliminary ciphertext (i.e. as discussed above in reference to ciphertext encryptor 112). Ciphertext decryptor 114 may re-compute the second preliminary ciphertext by generating, using the encryption key, a second decrypt ciphertext using the encryption operation receiving the second block and the first decrypt ciphertext as inputs. The second decrypt ciphertext may be the same as the second preliminary ciphertext (i.e. as discussed above in reference to ciphertext encryptor 112). Ciphertext decryptor 114 may decrypt the third block by performing the encryption operation receiving the encryption key, the first ciphertext and the second decrypt ciphertext as inputs.

Ciphertext decryptor 112 may perform decryption of the plaintext using cipher block chaining (CBC). An example CBC operation may look something like what is shown in Table 3 below. Table 3 depicts an example CBC operation to decrypt the text that was encrypted in Tables 1-2.

TABLE 3

| P1 = D(K, C1) xor C3 |
| P2 = D(K, C2) xor C1 |

In the example CBC operation depicted in Table 3, D represents a decryption operation, K represents an encryption key, P1 represents a first block of a plaintext and P2 represents a second block of the plaintext. C1 is a ciphertext (i.e. first finalized ciphertext) corresponding to the first block, C2 is a ciphertext (i.e. second finalized ciphertext) corresponding to the second block and C3 represents a ciphertext (i.e. first ciphertext) corresponding to the third block of the plaintext.

Ciphertext decryptor 112 may decrypt the ciphertext by computing the first plaintext block (P1) and the second plaintext block (P2). The first plaintext block (P2) may be decrypted (D) by performing, using the encryption key (K), the encryption operation (for example, an xor operation) receiving the first finalized ciphertext (C1) and the first ciphertext (C3) as inputs. The second plaintext block (P2) may be decrypted (D) by performing, using the encryption key (K), the encryption operation (for example, an xor operation) receiving the second finalized ciphertext (C2) and the first finalized ciphertext (01) as inputs.

Ciphertext decryptor 112 may also decrypt the third block (P3) of the plaintext. An example CBC operation for decrypting the third block of the plaintext may look something like what is shown in Table 4 below.

TABLE 4

| C1* = E(K, P1), |
| C2* = E(K, P2 xor C1*) |
| P3 = D(K, C3) xor C2* |

Ciphertext decryptor 112 may decrypt the third block (P3) of the plaintext by first re-computing the first initial ciphertext (CV') and the second initial ciphertext (C2*). Ciphertext decryptor 112 may re-compute the first initial ciphertext by performing an encryption (E) using the encryption key (K) and the first block (P1). Ciphertext decryptor 112 may re-compute the second initial ciphertext by performing an encryption (E), using the encryption key (K) and the encryption operation (for example, an xor operation) receiving the second block (P2) and the first initial ciphertext (C1*) as inputs. Ciphertext decryptor 112 may decrypt (D) the third block (P3) by performing the encryption operation (for example, an xor operation) receiving the encryption key (K), the first ciphertext (C3) and the second initial ciphertext (C2*) as inputs. Although the example depicted in Tables 3-4 describes using three blocks, the three block implementation is described for the sake of simplicity and the techniques discussed herein may be used with more than three blocks.

In the example depicted above in reference to Tables 1-4, the total number of the block cipher computations for encryption and decryption may be 2n−1 or less, when the length of the plaintext/ciphertext is n blocks.

In one aspect, ciphertext encryptor 112 may generate ciphertexts using a CBC-CTR based cipher chain. This aspect may be realized without using an initial value. In this aspect, the preliminary value and the first ciphertext may be generated as described above, but the finalized ciphertext(s) may be determined using the CTR mode. Referring to the example presented above in reference to Tables 1-4 for example, the first preliminary ciphertext, the second preliminary ciphertext and the first ciphertext may be generated as described above using the CBC mode.

When the first block (P1) and the second block (P2) are re-encrypted, the CTR mode may be utilized by using the first ciphertext (C3) as a CTR1 value. The CTR1 value may then be incremented when generating additional ciphertexts. For example, ciphertext encryptor 112 may generate the first finalized ciphertext (01) by encrypting the first block (P1) of the plaintext. Specifically, ciphertext encryptor 112 may perform encryption of the first block (P1) using the encryption key (K) and performing an encryption operation (for example, an xor operation) using the first block (P1) and the first CTR1 value as inputs. Ciphertext encryptor 112 may then increment the CTR1 value. Ciphertext encryptor 112 may generate the second finalized ciphertext (C2) by encrypting the second block (P2) of the plaintext. Specifically, ciphertext encryptor 112 may perform encryption (E) of the second block (P2) using the encryption key (K) and performing an encryption operation (for example, an xor operation) using the second block (P2) and the incremented CTR1 value as inputs.

Likewise, during decryption, ciphertext decryptor 112 may decrypt the ciphertext as described in the examples above by using the CTR1 value and the incremented CTR1 value to re-compute the first plaintext block (P1) and the second plaintext block (P2). The first plaintext block (P2) may be decrypted (D) by performing, using the encryption key (K), the encryption operation (for example, an xor operation) receiving the first finalized ciphertext (01) and the CTR1 value as inputs. The second plaintext block (P2) may be decrypted (D) by performing, using the encryption key (K), the encryption operation for example, an xor operation receiving the second finalized ciphertext (C2) and the incremented CTR1 value as inputs. Ciphertext decryptor 112 may also decrypt the third block (P3) of the plaintext as previously discussed. Of course this is an example, and other numbers of plaintext blocks can be encrypted and decrypted using the CBC-CTR mode.

In one aspect, ciphertext encryptor 112 may generate ciphertexts using a hash value. This aspect may be realized without using an initial value. Referring to the example presented above in reference to Tables 1-4 for example, in an aspect using the CBC mode and hash function, generating the first preliminary ciphertext (CV') and the second preliminary ciphertext (C2*) may be replaced by using a hash value of the first block (P1) and the second block (P2). In this aspect, the total number of the block cipher computations for encryption and decryption may be n, when the length of the plaintext/ciphertext is n blocks. The only extra computation may be the hash function. Although the example implementation of this aspect was described in reference to the CBC mode, the hash value can be used with other modes, such as, for example, the CBC-CTR mode.

The aspect using the hash function may be used for certain implementation applications, when computing a hash function on a given data string may be more efficient than encrypting the string. For example, using Secure Hash Algorithm 3 (SHA3) against Advanced Encryption Standard (AES). The output of the hash function may be truncated if the length of the hash function output is longer than a block size.

Figure 2:
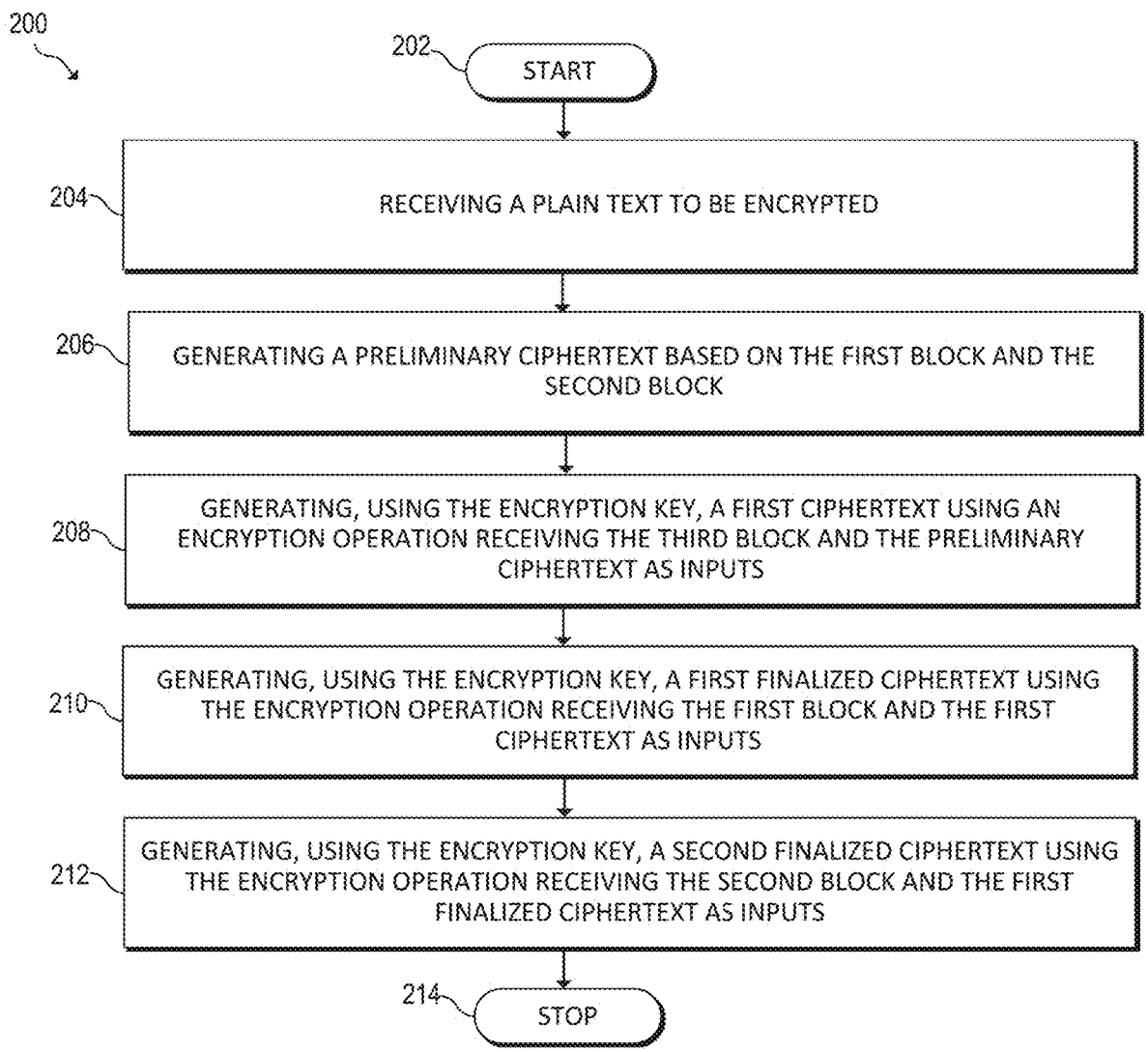
FIG. 2 is a flowchart of an example method for text encryption.

FIG. 2 is a flowchart of an example method 200 for text encryption. Method 200 may be described below as being executed or performed by a system, for example, system 100 of FIG. 1, system 400 of FIG. 4 or system 500 of FIG. 5. Other suitable systems and/or computing devices may be used as well. Method 200 may be implemented in the form of executable instructions stored on at least one machine-readable storage medium of the system and executed by at least one processor of the system. The processor may include a Central Processing Unit (CPU) or another suitable hardware processor. The machine-readable storage medium may be non-transitory. Method 200 may be implemented in the form of electronic circuitry (e.g., hardware). At least one block of method 200 may be executed substantially concurrently or in a different order than shown in FIG. 2. Method 200 may include more or less blocks than are shown in FIG. 2. Some of the blocks of method 200 may, at certain times, be ongoing and/or may repeat. Method 200 may be performed without using an initial value. The IV may be setup as, for example, an empty string or a binary string with a value of zero and/or any other fixed value.

Method 200 may start at block 202 and continue to block 204, where the method may include receiving a plaintext to be encrypted. The plaintext may include n blocks including a first block, a second block and a third block. At block 206, the method may include generating a preliminary ciphertext based on the first block and the second block. In one aspect, generating the preliminary ciphertext may comprise generating a first preliminary ciphertext corresponding to the first block, using the first block and the encryption key and generating, using the encryption key, a second preliminary ciphertext corresponding to the second block using the encryption operation receiving the second block and the first preliminary ciphertext as inputs. In one aspect, generating the preliminary ciphertext may comprise generating a hash value of the first block and the second block.

At block 208, the method may include generating, using an encryption key, a first ciphertext using an encryption operation receiving the third block and the preliminary ciphertext as inputs. The encryption operation may comprise an xor operation. At block 210, the method may include generating, using the encryption key, a first finalized ciphertext using the encryption operation receiving the first block and the first ciphertext as inputs. At block 212, the method may include generating, using the encryption key, a second finalized ciphertext using the encryption operation receiving the second block and the first finalized ciphertext as inputs. Method 200 may eventually continue to block 214, where method 200 may stop.

Figure 3:
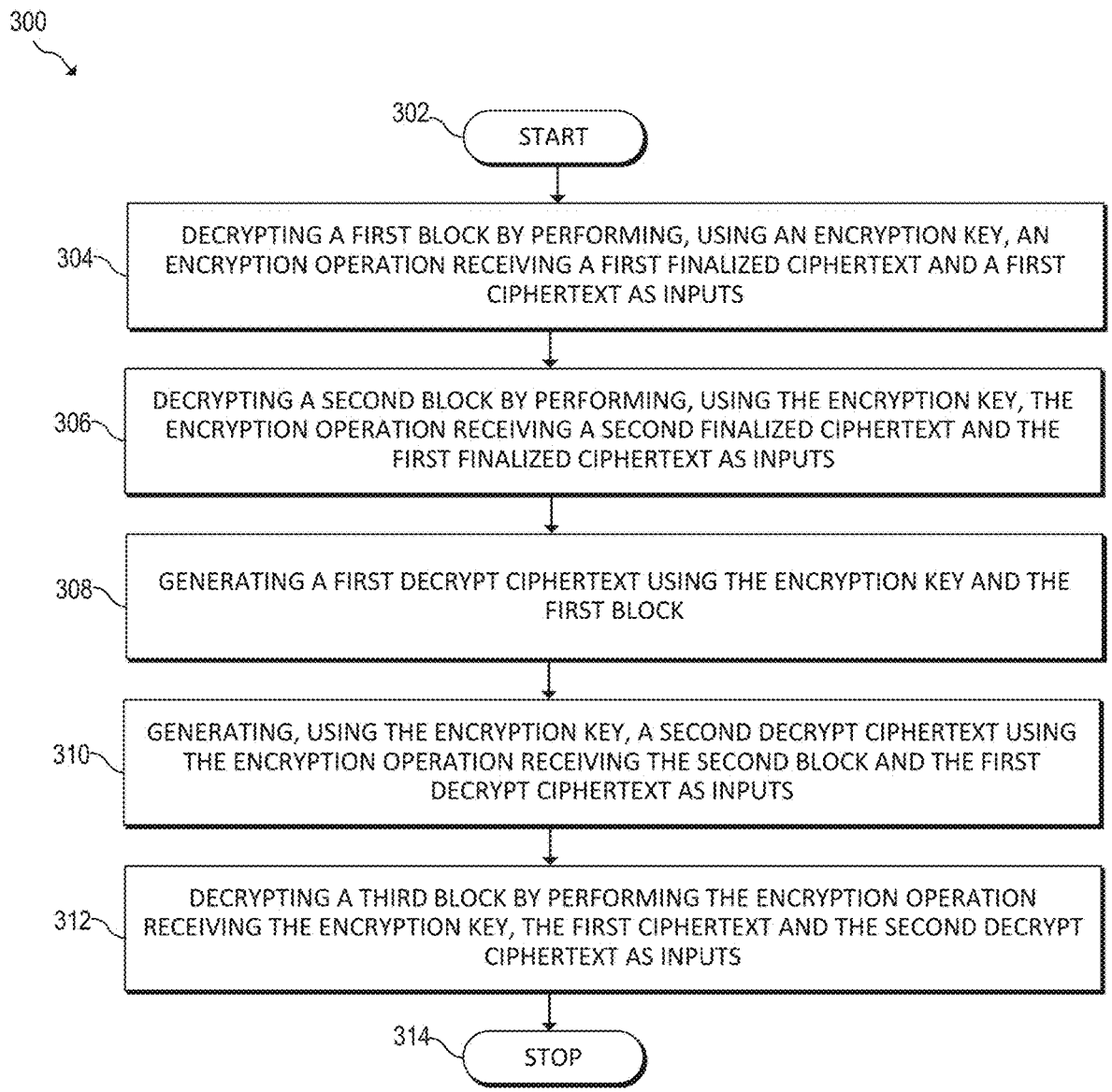
FIG. 3 is a flowchart of an example method for text decryption.

FIG. 3 is a flowchart of an example method 300 for text decryption. Method 300 may be performed, for example to decrypt plaintext that was encrypted using an encryption method, such as the method 200 described above in reference to FIG. 2. Method 300 may be described below as being executed or performed by a system, for example, system 100 of FIG. 1, system 400 of FIG. 4 or system 500 of FIG. 5. Other suitable systems and/or computing devices may be used as well. Method 300 may be implemented in the form of executable instructions stored on at least one machine-readable storage medium of the system and executed by at least one processor of the system. The processor may include a Central Processing Unit (CPU) or another suitable hardware processor. The machine-readable storage medium may be non-transitory. Method 300 may be implemented in the form of electronic circuitry (e.g., hardware). At least one block of method 300 may be executed substantially concurrently or in a different order than shown in FIG. 3. Method 300 may include more or less blocks than are shown in FIG. 3. Some of the blocks of method 300 may, at certain times, be ongoing and/or may repeat.

Method 300 may start at block 302 and continue to block 304, where the method may include decrypting a first block by performing, using an encryption key, an encryption operation receiving a first finalized ciphertext and a first ciphertext as inputs. At block 306, the method may include decrypting a second block by performing, using the encryption key, the encryption operation receiving a second finalized ciphertext and the first finalized ciphertext as inputs. At block 308, the method may include generating a first decrypt ciphertext using the encryption key and the first block. At block 310, the method may include generating, using the encryption key, a second decrypt ciphertext using the encryption operation receiving the second block and the first decrypt ciphertext as inputs. At block 312, the method may include decrypting a third block by performing the encryption operation receiving the encryption key, the first ciphertext and the second decrypt ciphertext as inputs. Method 300 may eventually continue to block 314, where method 300 may stop.

Figure 4:
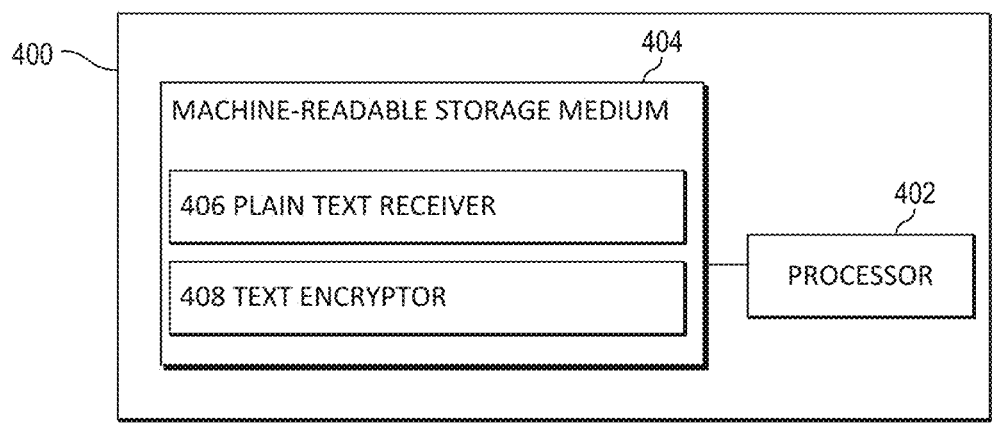
FIG. 4 is a block diagram of an example system for text encryption.

FIG. 4 is a block diagram of an example system 400 for text encryption. System 400 may include a processor 402 and a memory 404 that may be coupled to each other through a communication link (e.g., a bus). Processor 402 may include a Central Processing Unit (CPU) or another suitable hardware processor. In some examples, memory 404 stores machine readable instructions executed by processor 402 for system 400. Memory 404 may include any suitable combination of volatile and/or non-volatile memory, such as combinations of Random Access Memory (RAM), Read-Only Memory (ROM), flash memory, and/or other suitable memory.

Memory 404 stores instructions to be executed by processor 402 including instructions for a plaintext receiver 406 and a text encryptor 408. The components of system 400 may be implemented in the form of executable instructions stored on at least one machine-readable storage medium of system 400 and executed by at least one processor of system 400. The machine-readable storage medium may be non-transitory. Each of the components of system 400 may be implemented in the form of at least one hardware device including electronic circuitry for implementing the functionality of the component.

Processor 402 may execute instructions of plaintext receiver 406 to receive a plaintext to be encrypted, wherein the plaintext includes a set of n blocks. The set of n blocks may further include a first block, a second block and a third block. Processor 402 may execute instructions of text encryptor 408 to encrypt at least one block of the plaintext using an encryption operation. The encryption operation may comprise an xor operation. Processor 402 may execute instructions of text encryptor 408 to perform encryption without using an initial value (IV). The IV may be setup as, for example, an empty string or a binary string with a value of zero and/or any other fixed value.

Processor 402 may execute instructions of text encryptor 408 to generate a first preliminary ciphertext corresponding to a first block belonging to the set, using an encryption key and the first block. Processor 402 may execute instructions of text encryptor 408 to generate a second preliminary ciphertext corresponding to a second block belonging to the set using the first preliminary ciphertext and the encryption key.

Processor 402 may execute instructions of text encryptor 408 to generate an nth ciphertext corresponding to the nth block belonging to the set using an encrypted n−1 block and the encryption key. Processor 402 may execute instructions of text encryptor 408 to generate a first finalized ciphertext corresponding to the first block belonging to the set using the encrypted nth block and the encryption key. Processor 402 may execute instructions of text encryptor 408 to generate a second finalized ciphertext corresponding to the second block belonging to the set using the first finalized ciphertext and the encryption key. A total number of block cipher computations performed by the text encryptor 408 and a text decyrptor may be less than or equal to 2n−1.

Figure 5:
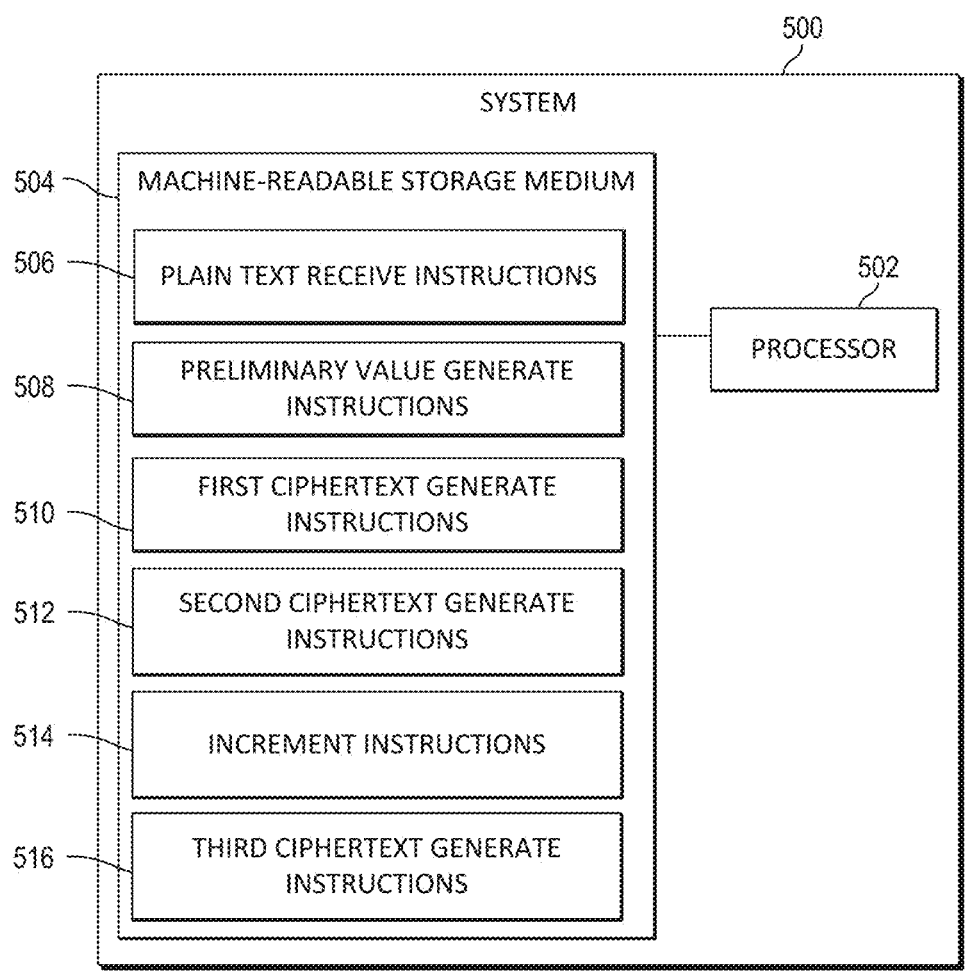
FIG. 5 is a block diagram of an example system for text encryption.

FIG. 5 is a block diagram of an example system 500 for text encryption. System 500 may be similar to system 100 of FIG. 1, for example. In the example illustrated in FIG. 5, system 500 includes a processor 502 and a machine-readable storage medium 504. Although the following descriptions refer to a single processor and a single machine-readable storage medium, the descriptions may also apply to a system with multiple processors and multiple machine-readable storage mediums. In such examples, the instructions may be distributed (e.g., stored) across multiple machine-readable storage mediums and the instructions may be distributed (e.g., executed by) across multiple processors.

Processor 502 may be at least one central processing unit (CPU), microprocessor, and/or other hardware devices suitable for retrieval and execution of instructions stored in machine-readable storage medium 504. In the example illustrated in FIG. 5, processor 502 may fetch, decode, and execute instructions 506, 508, 510, 512, 514 and 516 to perform text encryption. Processor 502 may include at least one electronic circuit comprising a number of electronic components for performing the functionality of at least one of the instructions in machine-readable storage medium 504. With respect to the executable instruction representations (e.g., boxes) described and shown herein, it should be understood that part or all of the executable instructions and/or electronic circuits included within one box may be included in a different box shown in the figures or in a different box not shown.

Machine-readable storage medium 504 may be any electronic, magnetic, optical, or other physical storage device that stores executable instructions. Thus, machine-readable storage medium 504 may be, for example, Random Access Memory (RAM), an Electrically-Erasable Programmable Read-Only Memory (EEPROM), a storage drive, an optical disc, and the like. Machine-readable storage medium 504 may be disposed within system 500, as shown in FIG. 5. In this situation, the executable instructions may be "installed" on the system 500. Machine-readable storage medium 504 may be a portable, external or remote storage medium, for example, that allows system 500 to download the instructions from the portable/external/remote storage medium. In this situation, the executable instructions may be part of an "installation package". As described herein, machine-readable storage medium 504 may be encoded with executable instructions for context aware data backup. The machine-readable storage medium may be non-transitory.

Referring to FIG. 5, plaintext receive instructions 506, when executed by a processor (e.g., 502), may cause system 500 to receive a plaintext to be encrypted, The plaintext may include n blocks including a first block, a second block and a third block. Preliminary value generate instructions 508, when executed by a processor (e.g., 502), may cause system 500 to generate a preliminary value based on the first block and the second block. Preliminary value generate instructions 508, when executed by a processor (e.g., 502), may cause system 500 to generate the preliminary value without using an initial value. The IV may be setup as, for example, an empty string or a binary string with a value of zero and/or any other fixed value. In one aspect, preliminary value generate instructions 508, when executed by a processor (e.g., 502), may cause system 500 to generate a preliminary first ciphertext using the first bock and the encryption key and generate a preliminary second ciphertext using the encryption operation receiving the second block and the preliminary first ciphertext as inputs. In one aspect, preliminary value generate instructions 508, when executed by a processor (e.g., 502), may cause system 500 to generate a hash value of the first block and the second block.

First ciphertext generate instructions 510, when executed by a processor (e.g., 502), may cause system 500 to generate, using an encryption key, a first ciphertext with an encryption operation receiving the third block and the preliminary value as inputs. First ciphertext generate instructions 510, when executed by a processor (e.g., 502), may cause system 500 to generate the first ciphertext without using an initial value. The encryption operation may comprise an xor operation.

Second ciphertext generate instructions 512, when executed by a processor (e.g., 502), may cause system 500 to generate, using the encryption key, a second ciphertext with the encryption operation receiving the first block and the first ciphertext as inputs. Second ciphertext generate instructions 512, when executed by a processor (e.g., 502), may cause system 500 to generate the second ciphertext without using an initial value. Increment instructions 514, when executed by a processor (e.g., 502), may cause system 500 to increment the second ciphertext. Third ciphertext generate instructions 516 may cause system 500 to generate, using the encryption key, a third ciphertext with the encryption operation receiving the second block and the incremented second ciphertext as inputs. Third ciphertext generate instructions 514, when executed by a processor (e.g., 502), may cause system 500 to generate the third ciphertext without using an initial value.

The foregoing disclosure describes a number of examples for text encryption. The disclosed examples may include systems, devices, computer-readable storage media, and methods for text encryption. For purposes of explanation, certain examples are described with reference to the components illustrated in FIGS. 1-5. The functionality of the illustrated components may overlap, however, and may be present in a fewer or greater number of elements and components. Further, all or part of the functionality of illustrated elements may co-exist or be distributed among several geographically dispersed locations. Further, the disclosed examples may be implemented in various environments and are not limited to the illustrated examples.

Further, the sequence of operations described in connection with FIGS. 1-5 are examples and are not intended to be limiting. Additional or fewer operations or combinations of operations may be used or may vary without departing from the scope of the disclosed examples. Furthermore, implementations consistent with the disclosed examples need not perform the sequence of operations in any particular order. Thus, the present disclosure merely sets forth possible examples of implementations, and many variations and modifications may be made to the described examples.

The invention claimed is:

1. A method comprising:
receiving a plaintext to be encrypted, wherein the plaintext includes a first block, a second block and a third block;
generating a preliminary ciphertext based on the first block and the second block;
generating, using an encryption key, a first ciphertext using an encryption operation receiving the third block and the preliminary ciphertext as inputs;
generating, using the encryption key, a first finalized ciphertext using the encryption operation receiving the first block and the first ciphertext as inputs; and
generating, using the encryption key, a second finalized ciphertext using the encryption operation receiving the second block and the first finalized ciphertext as inputs.

2. The method of claim 1, wherein generating the preliminary ciphertext comprises:
generating a first preliminary ciphertext corresponding to the first block, using the first block and the encryption key; and
generating, using the encryption key, a second preliminary ciphertext corresponding to the second block using the encryption operation receiving the second block and the first preliminary ciphertext as inputs.

3. The method of claim 1, wherein generating the preliminary ciphertext comprises:
generating a hash value of the first block and the second block.

4. The method of claim 1, wherein the method is performed without using an initial value.

5. The method of claim 1, wherein the method is performed using a binary string with a fixed value as an initial value.

6. The method of claim 1, wherein the method is performed using an empty string as an initial value.

7. The method of claim 1, wherein the encryption operation comprises an xor operation.

8. The method of claim 1 comprising:
decrypting the first block by performing, using the encryption key, the encryption operation receiving the first finalized ciphertext and the first ciphertext as inputs;
decrypting the second block by performing, using the encryption key, the encryption operation receiving the second finalized ciphertext and the first finalized ciphertext as inputs;
generating a first decrypt ciphertext using the encryption key and the first block;
generating, using the encryption key, a second decrypt ciphertext using the encryption operation receiving the second block and the first decrypt ciphertext as inputs; and
decrypting the third block by performing the encryption operation receiving the encryption key, the first ciphertext and the second decrypt ciphertext as inputs.

9. A system comprising:
a plaintext receiver to receive a plaintext to be encrypted, wherein the plaintext includes a set of n blocks and n is greater than two;
a text encryptor to:
generate a first preliminary ciphertext corresponding to a first block belonging to the set, using an encryption key and the first block;
generate a second preliminary ciphertext corresponding to a second block belonging to the set using the first preliminary ciphertext and the encryption key;
generate an nth ciphertext corresponding to an nth block belonging to the set using an encrypted n−1 block and the encryption key;
generate a first finalized ciphertext corresponding to the first block belonging to the set using an encrypted nth block and the encryption key; and
generate a second finalized ciphertext corresponding to the second block belonging to the set using the first finalized ciphertext and the encryption key.

10. The system of claim 9, wherein the text encryptor performs encryption without using an initial value.

11. The system of claim 9 comprising:
a text decryrptor to:
decrypt the first block using the first finalized ciphertext, the nth ciphertext and the encryption key;
decrypt the second block using the second finalized ciphertext, the first finalized ciphertext and the encryption key;
re-compute the first preliminary ciphertext using the first block and the encryption key;
re-compute the second preliminary ciphertext using the second block, the first preliminary ciphertext and the encryption key; and
decrypt the nth block using the nth ciphertext, the encrypted n−1 block and the encryption key.

12. The system of claim 11, wherein a total number of block cipher computations performed by the text encryptor and the text decryrptor is less than or equal to 2n−1.

13. A non-transitory machine-readable storage medium encoded with instructions, the instructions executable by a hardware processor of a system to cause the system to:
receive a plaintext to be encrypted, wherein the plaintext includes a first block, a second block and a third block;
generate a preliminary value based on the first block and the second block;
generate, using an encryption key, a first ciphertext with an encryption operation receiving the third block and the preliminary value as inputs;
generate, using the encryption key, a second ciphertext with the encryption operation receiving the first block and the first ciphertext as inputs;
increment the second ciphertext; and
generate, using the encryption key, a third ciphertext with the encryption operation receiving the second block and the incremented second ciphertext as inputs.

14. The non-transitory machine-readable storage medium of claim 13, wherein the instructions are to cause the hardware processor to perform the generation of the first ciphertext, the generation of the second ciphertext and the generation of the third ciphertext without using an initial value and wherein the instructions executable by the hardware processor of the system to generate the preliminary value cause the system to:

generate a preliminary first ciphertext using the first block and the encryption key; and generate a preliminary second ciphertext using the encryption operation receiving the second block and the preliminary first ciphertext as inputs.

15. The non-transitory machine-readable storage medium of claim 13, wherein the instructions are to cause the hardware processor to perform the generation of the first ciphertext, the generation of the second ciphertext and the generation of the third ciphertext without using an initial value and wherein the instructions executable by the hardware processor of the system to generate the preliminary value further cause the system to:

generate a hash value of the first block and the second block.

\* \* \* \* \*